`2,930,790`

PROCESS FOR RECOVERING MONOMERIC ε-CAPROLACTAM FROM POLY-ε-CAPROLACTAM

Johannes Weise, Krefeld-Bockum, Germany, assignor to Farbenfabriken Bayer Aktiengesellschaft, Leverkusen, Germany, a corporation of Germany No Drawing. Application January 21, 1959
Serial No. 788,029

Claims priority, application Germany February 4, 1958

3 Claims. (Cl. 260—239.3)

This invention is concerned with a process for recovering monomeric ε-caprolactam from poly-ε-caprolactam.

It is known to obtain monomeric ε-caprolactam from polyamides which are made completely or preponderately from residues from ε-aminocapronic acid, especially polyamide waste material, by heating the polyamide in the presence of phosphoric acid and possibly of monomeric lactam at temperatures above 240° C. and preferably under 300° C. and continuously distilling off the monomeric lactam formed in a vacuum. Nevertheless, the degree of purity of the lactam so obtained is not always sufficient for use again in the production of polyamides. Furthermore, there are difficulties in the technical carrying out of this process since, initially, the phosphoric acid acts slowly with the polyamide. Not least, however, is the fact that the phosphoric acid corrodes even high quality chromium-nickel steels at temperatures above 80° C. to such a degree that a considerable loss of material takes place in the distillation vessel.

We have now found that these disadvantages can be overcome to a large degree in the production of monomeric ε-caprolactam from the corresponding polyamides in that the thermal splitting of the polyamide is started in the presence of a lactam-phosphoric acid compound, this compound being formed by heating molar quantities of lactam and phosphoric acid.

It is certainly to be assumed that in the known process mentioned above, lactam-phosphoric acid compounds are formed in the course of the formation of an equilibrium between the participants in the reaction, nevertheless, only gradually in the course of the reaction whereby that process suffers from the disadvantages already mentioned.

The above-mentioned lactam-phosphoric acid compound is easily obtained by heating molar quantities of ε-caprolactam and phosphoric acid at temperatures between about 70 and 90° C., for about 20–40 minutes. This compound is mixed with the waste polyamide material to be broken down and the mixture heated to temperatures above about 240° C., for example, to 250° C. and the lactam formed is distilled off from the polyamide in a known manner under reduced pressure. About 25–30 parts of the lactam-phosphoric acid compound suffice for the splitting of about 100 parts of polyamide.

The following examples are given for the purpose of illustrating the invention:

EXAMPLE 1

(a) 25.0 kilograms phosphoric acid (61–62 percent $P_2O_5$) and 25.0 kilograms melted caprolactam are thoroughly mixed together for 30 minutes with stirring at 80° C. The lactam-phosphoric acid compound formed, which has a low viscosity, is then allowed to run into a 450 litre distillation vessel made from V4A Ex-steel which is filled with 190 kilograms polyamide residues. The vessel is heated under a vacuum at 250° C. and the lactam formed from the polyamide distils over at a pressure of 6–12 mms. The distillation velocity is so adjusted that 30 kilograms are obtained per hour as distillate. Altogether, 194 kilograms lactam are obtained. The yield amounts to 194 kilograms−25 kilograms=169 kilograms, i.e. 89 percent of theory. The split lactam has, after distilling again with a little alkali, the following values:

Permanganate number _____ 1800
Solidification point, ° C. _____ 69.05

(b) In a comparative experiment, the phosphoric acid used for the depolymerisation is not added in the form of the lactam-phosphoric acid compound but directly as pure acid. The material used consists of 25 kilograms phosphoric acid (61–62 percent $P_2O_5$) and 190 kilograms polyamide residues. It is distilled in a known manner. The yield of lactam amounts to 166 kilograms, i.e. 87.3 percent of theory. After a redistillation with a small amount of alkali, the following values are obtained:

Permanganate number _____ 800
Solidification point, ° C. _____ 68.85

Thus, the quality of the lactam obtained is clearly inferior than in the case of using the lactam-phosphoric acid compound.

EXAMPLE 2

*Corrosion test with acid resistant steel (V4A Ex-steel)*

(a) The experiments were carried out under the conditions necessary for the breaking down of polyamides.

150 grams polyamide waste and 40 grams of the lactam-phosphoric acid compound (produced as in Example 1) were placed in the round flask of a vacuum distillation apparatus. At the same time, in order to examine the corrosion a plate of V4A Ex-steel, 50 x 50 x 2 mms. in size, was placed in the distillation flask. The depolymerisation and distillation of the lactam took place in the manner described in Example 1. At the end of the distillation, the distillation residue was removed and the flask prepared for a new bath of starting material. Altogether, 5 polyamide depolymerisations of this type were carried out in the presence of the V4A Ex-steel sample, each depolymerisation lasting 4½ hours. Finally, the loss in weight of the steel plate was determined and the loss in weight per square metre per day calculated from the result. It amounted to 8 grams per square metre per day.

(b) Experiments carried out in an analogous manner with polyamide and phosphoric acid, the experiments lasting the same time, gave a considerably higher loss in weight. Calculated as square meters per day the loss amounted to 64 grams. The durability of the material under these conditions is no longer sufficient.

(c) Over a period of three months, 19 metric tons of polyamide waste were continuously passed through a pilot plant (distillation vessel made from V4A Ex-material). The phosphoric acid (total of 2.4 metric tons of 85 percent acid) was subsequently added in the form of the lactam-phosphoric acid compound. Afterwards the distillation flask was opened and the degree of corrosion determined. No attack on the wall of the distillation vessel could be seen and only very slight alterations were visible on the heating coils. The material proved itself to be practically unchanged.

The plant was in use for a further six months under the same conditions. After examination for corrosion, the same results were obtained. The attack on the heating coil was so insignificant that the plant can be put into use again.

I claim:

1. Process for recovering ε-caprolactam from corresponding polyamides wherein the polyamide is heated with a lactam-phosphoric acid compound at a temperature above 240° C. and under reduced pressure.

2. Process according to claim 1, wherein the lactam-phosphoric acid compound is formed by heating together molecular amounts of ε-caprolactam and phosphoric acid.

3. Process according to claim 1 wherein the ratio of the lactam-phosphoric acid compound to the polyamide is between 25:100 and 30:100 parts by weight.

No references cited.